2 Sheets—Sheet 1.

J. B. TARR.
KEEL FOR SHIPS OR OTHER NAVIGABLE VESSELS.

No. 47,879. Patented May 23, 1865.

Witnesses
Inventor:

2 Sheets—Sheet 2.

J. B. TARR.
KEEL FOR SHIPS OR OTHER NAVIGABLE VESSELS.

No. 47,879. Patented May 23, 1865.

Witnesses:
C. L. Topliff
Henry Adams

Inventor:
J. B. Tarr

UNITED STATES PATENT OFFICE.

J. B. TARR, CHICAGO, ILLINOIS.

IMPROVED KEEL FOR SHIPS AND OTHER NAVIGABLE VESSELS.

Specification forming part of Letters Patent No. 47,879, dated May 23, 1865.

*To all whom it may concern:*

Be it known that I, J. B. TARR, of Chicago, in the county of Cook and State of Illinois, have invented a new and useful Improvement in Keels of Ships and other Vessels; and I do hereby declare that the following is a full, clear, and exact description thereof, which will enable those skilled in the art to make and use the same, reference being had to the accompanying drawings, forming part of this specification, in which—

Figure 1:
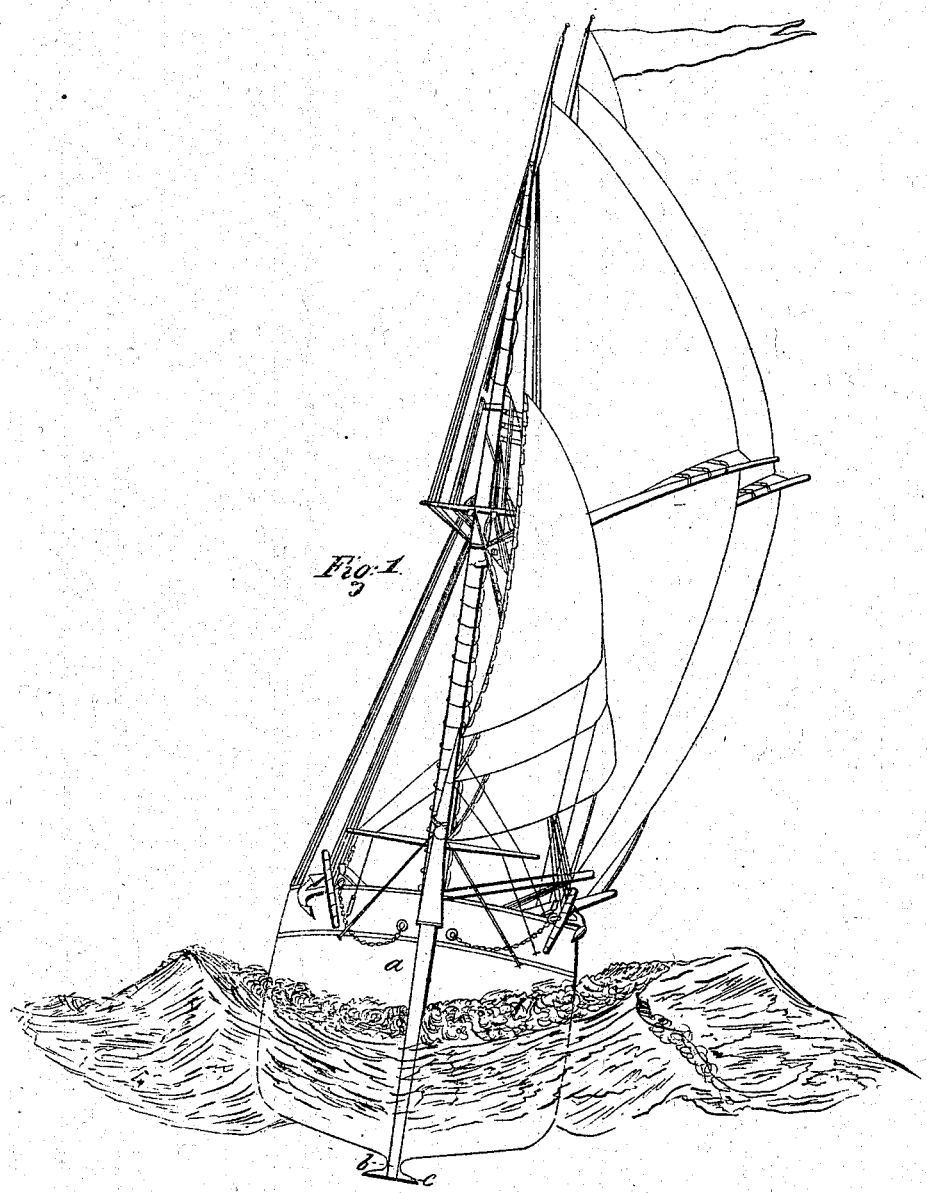
Figure 2:
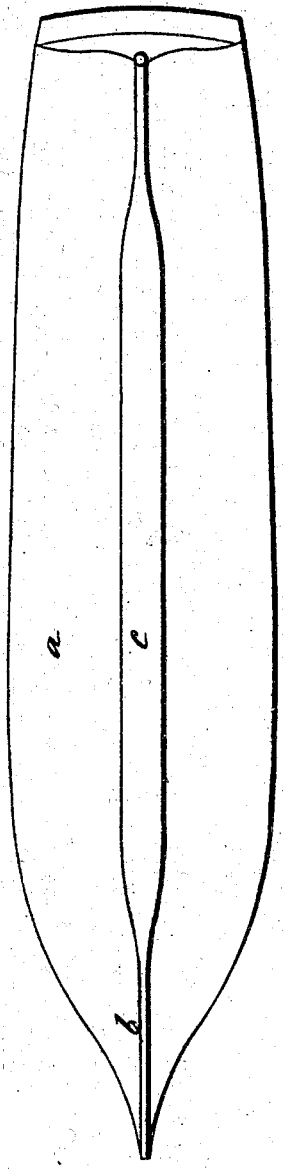

Figure 1 represents a vessel with my improvement applied thereto. Fig. 2 shows a plan view of my improvement as seen when the vessel is inverted.

Similar letters of reference indicate corresponding parts.

In order to explain and describe my invention the more clearly, it is proper to state that ordinarily the vessels which navigate the lakes are not provided with keels, because of the large proportion of shallow water abounding in those lakes, and therefore, instead of keels they are provided with center-boards, whose construction and operation need not be here particularly described further than to state that the vessels are provided with long wells extending in the center of their width about two-thirds the whole length of the vessel, of a width sufficient for the free ascent and descent of the center-board. This well of course rises above the deck, and its sides are made stout and sealed against leakage by calking and other means. The center-board required is of various degrees of strength, according to the tonnage of the vessel, and its weight must be such as to sink it readily when lowered by the windlass. This weight is such in a vessel of, say, five hundred tons as to require four or five men at a well-geared windlass to raise it partially up within its well. The center-board is not a successful substitute for the keel, because in a stiff wind, when a vessel is sailing on a course like that shown in the drawings, very often the center-board is broken in two by the strain, and the vessel will then be driven ashore and wrecked or damaged and the cargo wholly or partially lost. Oftentimes also the upper part of the well-hole is so thumped by the constant vibration of the board as to be weakened and broken, so as to cause that part of the vessel to leak. The same thing occurs in the lower part of the well when the center-board is drawn up above the bottom line of the vessel. This is the chief cause why grain and other cargoes brought to Buffalo and other places from Chicago and other Western ports arrive in a wet and damaged condition, requiring to be passed through grain-drying machines before they are offered for sale. It is evident therefore that any device which will enable a vessel to navigate those shallow waters without resort to the cumbrous center-board and without the deep keels necessary for navigating deep waters will be of great advantage to the public as well as the navigator.

My invention consists in constructing a keel which shall expand laterally on each side of the longitudinal center of the vessel's bottomer as seen in Fig. 1, so as partially to inclose a large body of water on each side thereof.

The vessel in the drawings is distinguished by the letter *a* and the vertical keel by the letter *b*. The vertical keel *b* is to be made very shallow, merely serving as the foundation of the horizontal keel *c*, which is bolted to it very strongly, so as to be able to resist every possible strain arising in ordinary navigation. The horizontal keel *c* is to extend from the "run" of the bow to the run of the stern, gradually subsiding into the keel at those points, and is to be of a width about in proportion to that shown in the drawings. The total vertical distance from the bottom of the vessel through both keels to the lower face of the horizontal keel should be from ten to eighteen inches, so as to enable the vessel to move in exceedingly shallow water.

The operation of the horizontal keel is to take hold upon or partially to inclose a large body of water on each side of the vertical keel, so as to prevent the lateral displacement of the water, and thereby to hold the vessel steady in her course. The angles or angular spaces subtended between the bottom of the vessel and the upper faces of the horizontal keel are to vary with the size of the vessel, and it is clear that the resistance of the horizontal keel against lateral force will be increased in proportion to the extension of its faces laterally. The horizontal keel may be of one piece, secured directly to the bottom of the vessel so as to leave an angular space on each side, as shown in Fig. 1.

My improvement will also apply as well in river and coastwise navigation as upon the lakes. It should be remarked also that whenever a vessel that depends upon a center-board approaches a coast or shoal by accident it becomes necessary to raise the board to prevent it from being broken, when if the shoal or coast is to the leeward the vessel is at once at the mercy of the wind and current, being deprived of her keel just when it is needed.

I claim as new and desire to secure by Letters Patent—

The horizontal keel $c$, when constructed and applied as herein specified, so that its upper surface will be nearly parallel with the ship's bottom and its edge on the lee side will present an acute angle to the water while the ship is careened to any extent.

J. B. TARR.

Witnesses:
WM. F. MCNAMARA.
M. M. LIVINGSTON.